(12) United States Patent
Bialic

(10) Patent No.: US 10,326,525 B2
(45) Date of Patent: Jun. 18, 2019

(54) PHOTOVOLTAIC RECEIVER DEVICE WITH POLARIZATION MANAGEMENT IN ORDER TO INCREASE THE RATE OF AN OPTICAL COMMUNICATION

(71) Applicant: SUNPARTNER TECHNOLOGIES, Rousset (FR)

(72) Inventor: Emilie Bialic, Rousset (FR)

(73) Assignee: GARMIN SWITZERLAND GMBH, Schaffhausen (CH)

( * ) Notice: Subject to any disclaimer, the term of this patent is extended or adjusted under 35 U.S.C. 154(b) by 0 days.

(21) Appl. No.: 15/739,306

(22) PCT Filed: Jun. 24, 2016

(86) PCT No.: PCT/FR2016/000108
§ 371 (c)(1),
(2) Date: Dec. 22, 2017

(87) PCT Pub. No.: WO2016/207500
PCT Pub. Date: Dec. 29, 2016

(65) Prior Publication Data
US 2018/0198524 A1   Jul. 12, 2018

(30) Foreign Application Priority Data
Jun. 24, 2015   (FR) ..................................... 15 01307

(51) Int. Cl.
*H04B 10/116*   (2013.01)
*H04B 10/67*   (2013.01)
(Continued)

(52) U.S. Cl.
CPC ............ *H04B 10/116* (2013.01); *H02S 20/22* (2014.12); *H02S 30/10* (2014.12); *Y02B 10/10* (2013.01)

(58) Field of Classification Search
CPC ..... H04B 10/116; H04B 10/67; H04B 10/691
See application file for complete search history.

(56) References Cited

U.S. PATENT DOCUMENTS

| 4,249,264 A | * | 2/1981 | Crochet | ............... | H04B 10/808 |
| | | | | | 398/141 |
| 2008/0122994 A1 | * | 5/2008 | Cernasov | .......... | G02F 1/133603 |
| | | | | | 349/1 |

(Continued)

FOREIGN PATENT DOCUMENTS

FR   3 013 923 A1   5/2015

OTHER PUBLICATIONS

International Search Report (PCT/ISA/210) dated Sep. 29, 2016, by the European Patent Office as the International Searching Authority for International Application No. PCT/FR2016/000108.
(Continued)

*Primary Examiner* — Shi K Li
(74) *Attorney, Agent, or Firm* — Buchanan Ingersoll & Rooney PC

(57) ABSTRACT

The invention relates to a wireless communication device which uses light, comprising at least: a light source emitting a modulated light signal; a photovoltaic module capable of receiving said modulated light signal; and an analog-to-digital converter electrically connected to the output terminals of said photovoltaic module, making it possible to convert the analog signal output by the photovoltaic module into a digital signal; characterised in that it also comprises a means for polarising said photovoltaic module making it possible to generate a polarisation voltage applied to the terminals of said photovoltaic module, and a management module capable of optimising said polarisation voltage into a threshold voltage corresponding to an improved signal-to-noise ratio and communication bandwidth.

10 Claims, 3 Drawing Sheets

(51) Int. Cl.
*H02S 20/22* (2014.01)
*H02S 30/10* (2014.01)

(56) References Cited

U.S. PATENT DOCUMENTS

2014/0003808 A1* 1/2014 Cheng ................... H04B 10/60
398/38
2014/0266313 A1 9/2014 Utsunomiya

OTHER PUBLICATIONS

Written Opinion (PCT/ISA/237) dated Sep. 29, 2016, by the European Patent Office as the International Searching Authority for International Application No. PCT/FR2016/000108.
Dr. Emilie Bialic, "Wysips Connect, the first solution for the indoor/outdoor VLC lighting saturation problematics", Feb. 26, 2015, retrieved from the internet: http://sunpartnertechnologies.com/wp-content/uploads/2012/08/White_Paper_Lifi_26_02_2015.pdf.

* cited by examiner

PHOTOVOLTAIC RECEIVER DEVICE WITH POLARIZATION MANAGEMENT IN ORDER TO INCREASE THE RATE OF AN OPTICAL COMMUNICATION

TECHNICAL FIELD OF THE INVENTION

The present invention relates to visible and invisible (infrared and ultraviolet) light communication devices of VLC ("Visible Light Communication") type and, more specifically, to photovoltaic reception modules that are polarized so that the communication rate is optimized.

PRIOR ART

Visible light (VLC or LiFi) or invisible light communication devices use light to transmit information between two remote points. In particular, visible light communication systems generally comprise a light-emitting diode (LED) or a module comprising an LED as transmission means and a photodetector as reception means.

LEDs emit a luminous flux with a characteristic emission spectrum that differs from the spectrum of natural light. As luminous fluxes are measured in lux, LiFi lux denotes the modulated luminous flux emitted by an LED. LiFi lux is thus the unit of measurement for the luminous flux specifying the lux level measured using a luxmeter when the light that is used is modulated and is generated by LEDs.

Several illumination levels are therefore defined that will be reused throughout this document:
- "low LiFi flux" emitted by an LED is understood to be a luminous flux below 200 LiFi lux;
- "medium LiFi flux" emitted by an LED is understood to be a luminous flux between 200 and 10 000 LiFi lux;
- "high LiFi flux" emitted by an LED is understood to be a luminous flux above 10 000 LiFi lux.

Within the context of LiFi communications, the LED provides a light signal in the visible, infrared (IR) and ultraviolet (UV) wavelength bands, the intensity of which signal is modulated as a function of the information to be transmitted. In particular, in the visible spectrum, LED lights have the advantage of providing a dual function, both of illuminating and of transmitting data. Their physical features allow rates in the gigabit per second order to be contemplated for dedicated systems. This LED can be formed by a single blue chip coated with a luminophore in order to allow white illumination or can be formed by a plurality of chips emitting different colors (RGYB, for example).

Such a LiFi communication system is advantageous in that most existing photodetectors associated with an information processing system can be used as reception means for analyzing the variation of the amplitude of the received light signal and to gather the transmitted information therefrom. In particular, most photovoltaic surfaces are photodetectors that convert the variations of the optical signal into variations of the electric signal.

Thus, a light receiver is known from document US 2014/266313 A1 that is intended to detect ambient light variations. This receiver comprises a photodiode and a circuit for processing the analog signal delivered by the photodiode, in order to detect when the light intensity passes above or below certain thresholds. However, this light receiver is devoid of any analog/digital converter. It also does not comprise a circuit for guiding a polarizing voltage toward a threshold voltage to increase the signal-to-noise ratio or the LiFi communication rate.

In general, the LiFi reception systems receive light originating from all the directions of the space without distinction, whether it is ambient light or modulated light emitted by a LiFi emitter.

In order to optimize the LiFi communication rate in an environment comprising other light sources, a technical problem arises. Indeed, the light originating from the LiFi LEDs needs to be able to be distinguished from the other light sources in order to increase the signal-to-noise ratio of the LiFi signal and, consequently, the transmission rate.

Most known (non-photovoltaic) light receptors are highly sensitive to ambient light and rapidly saturate in the presence of a high ambient luminous flux. For this reason, they no longer allow the variation of the light intensity of the LiFi signal to be reproduced when the saturation is established. However, these known light receptors are often very good receptors as long as the LiFi flux is not excessively high (<5000 lux).

Furthermore, it has been discovered that certain photovoltaic modules, which are chiefly designed to generate a significant electric voltage from light radiation, actually allow a high LiFi flux LiFi signal to be received, even in an environment with a high ambient luminous flux, and this is the case without the aforementioned saturation phenomenon being established. Thus, said photovoltaic modules are capable of receiving a LiFi signal originating from a LiFi source located outside without generating any disturbance on reception, contrary to the other light receptors.

However, a light receptor or a light reception system does not exist in the prior art that is capable of simultaneously operating in varied environments, such as those described below:
- reception of a low LiFi flux in an internal environment (<500 lux of ambient light);
- reception of a low LiFi flux (<200 LiFi lux) in an external light environment (<300 000 lux of ambient light);
- reception of a high LiFi flux with a light receptor positioned in the immediate vicinity of a lamp, in any environment.

The system proposed within the scope of the present invention aims to overcome this problem by proposing a LiFi light detection device capable of effectively operating in a variety of scenarios, particularly in the three aforementioned cases.

AIM OF THE INVENTION

The aim of the invention is to propose a reception device of VLC type capable of operating with a higher communication rate and/or a greater range than the known systems, and in any type of internal or external environment, equally in an environment with a low LiFi flux or a high LiFi flux, and whether the ambient light is low or high.

SUBJECT MATTER OF THE INVENTION

The subject matter of the invention relates to a wireless communication device based on visible or invisible light, and to a method for optimizing the signal-to-noise ratio and the communication rate.

In particular, the subject matter of the invention is a wireless communication device using light, comprising at least:
- one light source emitting a modulated light signal;
- one photovoltaic module capable of receiving said modulated light signal;

one analog/digital converter electrically connected to the output terminals of said photovoltaic module, allowing the analog signal delivered by the photovoltaic module to be converted into a digital signal;

characterized in that it further comprises means for polarizing said photovoltaic module capable of generating a polarizing voltage ($V_p$) applied to the terminals of said photovoltaic module, and a management module receiving as input the digital signal delivered by said analog/digital converter to optimize said polarizing voltage ($V_p$) toward a threshold voltage ($V_s$) corresponding to an improved signal-to-noise ratio (SNR) and communication rate.

According to one embodiment, said means for polarizing said photovoltaic module are formed by a voltage generator capable of generating a voltage on the terminals of the photovoltaic module, said voltage being equivalent to that generated by a non-modulated additional illumination, distinct from the modulated light signal.

According to another embodiment, said means for polarizing said photovoltaic module are formed by at least one continuous light source in addition to and distinct from the modulated light signal, said continuous light also illuminating the active surface of said photovoltaic module so as to create a polarizing voltage ($V_p$) controlled by said management module. In this case, said continuous light is preferably guided in a transparent plate that is positioned above the active surface of the photovoltaic module so that said continuous light reaches the active surface of the photovoltaic module.

Advantageously, said photovoltaic module or the source of modulated light or the transparent plate or the source of continuous light further comprise an optical system of lens, spectral filter or polarizing filter type.

The photovoltaic module preferably is semi-transparent, made up of a plurality of opaque active photovoltaic zones separated by transparent zones. It is formed by a single photovoltaic cell or by a plurality of photovoltaic cells electrically connected in series or in parallel.

The device according to the invention further comprises a signal processing module connected to the output of the analog/digital converter. This can comprise its own analog/digital converter.

According to the invention, the management module is configured to define, by successive iterations, the value of the optimal polarizing voltage ($V_s$) corresponding to the best signal-to-noise ratio of the communication. To this end, said management module comprises a processing program that considers, in real time, the output signal of the analog/digital converter and the value of the voltage corresponding to the non-modulated additional illumination.

The subject matter of the invention is also a method for optimizing the signal-to-noise ratio and the communication rate of a communication device as previously described, characterized in that it comprises steps consisting in:

1) initializing the system by:
a) measuring the signal level at the terminals of the photovoltaic module (1) (DC_ini);
b) measuring the reference signal-to-noise ratio (SNR_ref);
c) selecting a maximum permissible polarizing voltage;

2) adapting the polarizing of the photovoltaic module by:
a) increasing the polarizing voltage ($V_p$);
b) measuring the signal-to-noise ratio (SNR_mes), said measured signal-to-noise ratio (SNR_mes) being compared with the reference signal-to-noise ratio (SNR_ref);
c) if SNR_ref≤SNR_mes, then SNR_mes=SNR_ref and return to step 2) a);
d) if SNR_ref>SNR_mes, the module is polarized with the preceding polarizing value, which corresponds to the optimal value ($V_s$).

FIGURES

The invention will be better understood from its detailed description, with reference to the figures, in which.

DETAILED DESCRIPTION

Figure 1:
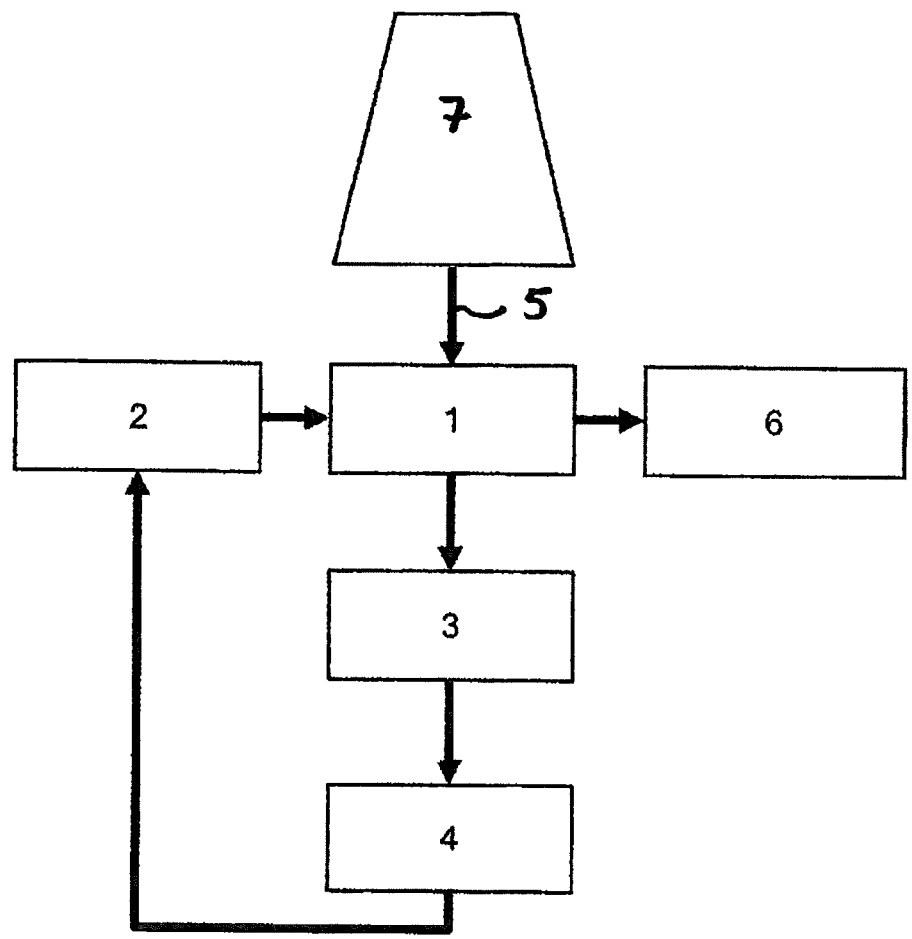
FIG. 1 is a block diagram of the reception device that is the subject matter of the invention.

With reference to FIG. 1, which is a block diagram of the reception device that is the subject matter of the invention. The module 1 is a photovoltaic module, preferably semi-transparent. It is thus made up of a plurality of opaque active photovoltaic zones separated by transparent zones. It is illuminated by a LiFi emitter 7 emitting a modulated light signal 5. An analog/digital converter 3 electrically connected to said photovoltaic module 1 allows the analog signal delivered by the photovoltaic module 1 to be converted into a digital signal. A processing module 4 receives as input the digital signal originating from the analog/digital converter 3. It is connected to a sensor (not shown) for measuring the continuous ambient light, i.e. non-modulated. In addition to the natural ambient light, a continuous light source can be used to generate a polarizing voltage $V_p$ by a photovoltaic effect. A "continuous light source" refers to a non-amplitude-modulated light source, as opposed to the modulated light carrying information in the communication by visible light. It can be an LED, for example.

The processing module 4 comprises a microprocessor executing an iterative program that allows the optimal nominal value $V_s$ of the polarizing voltage $V_p$ to be identified as a function of the modulated light signal 5 and of the ambient luminous environment. It controls the means 2 for polarizing said photovoltaic module 1, allowing a polarizing voltage $V_p$ to be achieved that is applied to the terminals of said photovoltaic module 1. A module 6 for processing the modulated signal can then process the digital information and optimize the received rate, in a manner per se known. This signal processing module 6 is either connected to the output of the analog/digital converter 3, if it does not comprise its own converter, or is connected to the terminals of the photovoltaic module 1 (which is the case shown) if it comprises its own analog/digital converter at the input.

Preferably, the semi-transparent photovoltaic module 1 is made up of a plurality of opaque active photovoltaic zones separated by transparent zones. Such a photovoltaic module is generally made up of at least three thin layers, which include a transparent electrode, an absorbing layer and a metal electrode. The transparent electrode can be formed by graphene, by metal nanostructures or even by a transparent conductive oxide, such as FTO, ITO, IZO, AZO, BZO, GZO or ZnO. The metal electrode is formed by a metal such as aluminum (Al), nickel (Ni), gold (Au), silver (Ag), copper (Cu), molybdenum (Mo), chromium (Cr), titanium (Ti) or palladium (Pd). The absorbing layer is made up of one or more inorganic and/or organic semi-conductive materials, for example, based on amorphous or microcrystalline silicon, GaAs (gallium arsenide), CdTe (cadmium telluride), CIGS (copper—indium—gallium—selenium) or based on polymers. It can involve junctions of the p-i-n or p-n type, or even tandem architectures, i.e. comprising a plurality of layers of materials that preferably absorb a different part of the light spectrum. They can be designed to convert the visible light and/or the ultraviolet light and/or the infrared light into electricity. Advantageously, the semi-conductive materials are selected to maximize photon capture in the targeted illumination conditions.

In order to ensure a good level of transparency for said photovoltaic module 1, said module preferably comprises transparent zones arranged in the layers of the absorber and of the metal electrode, so that an observer located in front of the substrate can see through said photovoltaic module. These transparent zones are thus configured to allow active photovoltaic zones to remain between them. The transparency of the photovoltaic module is a function of the surface fraction occupied by the opaque active photovoltaic zones. In an advantageous embodiment, the transparent zones are arranged in the transparent electrode in addition to the metal electrode and the absorbing layer, in order to increase light transmission at the transparent zones, since by reducing the number of interfaces, the optical reflection phenomena on the interfaces are minimized. The active photovoltaic zones can be of any shape and preferably can be in sizes such that they cannot be distinguished by the human eye. To this end, the width of the photovoltaic zones is preferably less than 200 micrometers. The active photovoltaic zones or the transparent zones can be organized into networks of elementary, linear, circular or polygonal geometric structures.

Figure 2:
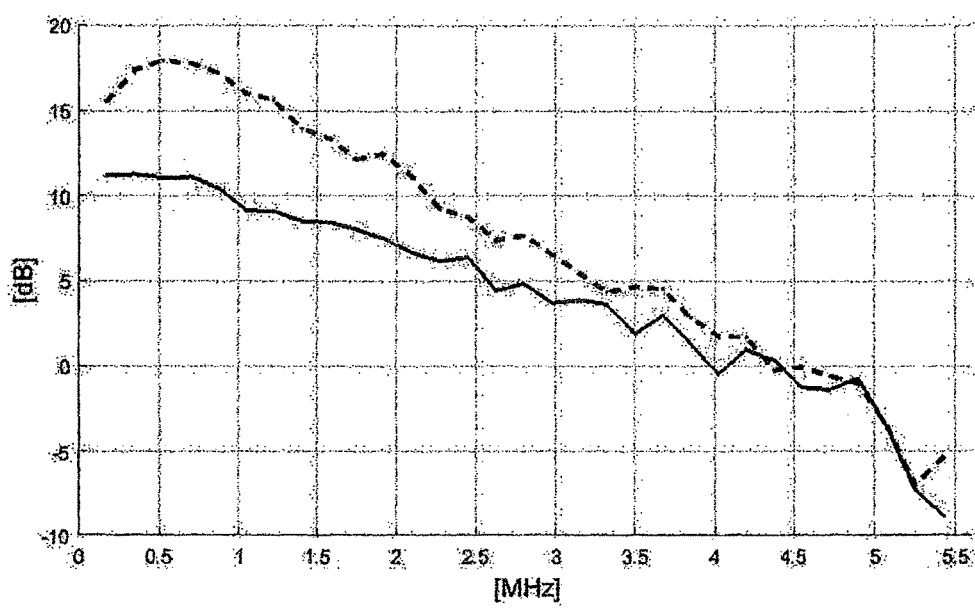
FIG. 2 shows the signal-to-noise ratio of the communication as a function of the frequency and for two particular configurations of said device.

FIG. 2 shows the value of the signal-to-noise ratio (SNR) at the output of the photovoltaic module 1 as a function of the frequency and for two particular luminous environment configurations. The first configuration corresponds to the solid line on the graph. It involves a measurement of the signal-to-noise ratio of the output signal of a semi-transparent photovoltaic module 1, for a 9000 lux modulated light signal 5 emitted by a light-emitting diode (LED) 7 in an 80 lux ambient luminous environment.

The second configuration, shown on the graph with a broken line, is a measurement of the signal-to-noise ratio of the same photovoltaic module 1 for the same 9000 lux modulated light signal 5, but in a 41 000 lux ambient environment obtained from a powerful LED spotlight. This figure surprisingly shows that the SNR is better in the second configuration that exhibits more light "noise". Consequently, the communication rate can be better when the semi-transparent photovoltaic module 1 is placed in an ambient luminous environment exhibiting an optimal light intensity, preferably controlled in real time to generate, using the polarizing means 2, a polarizing voltage $V_p$. The optimal continuous light intensity corresponds to an optimal polarizing voltage or to a threshold voltage $V_s$. Furthermore, the invention makes provision for this optimal light intensity to depend on the value of the signal emitted by the modulated light source 7.

Figure 3:
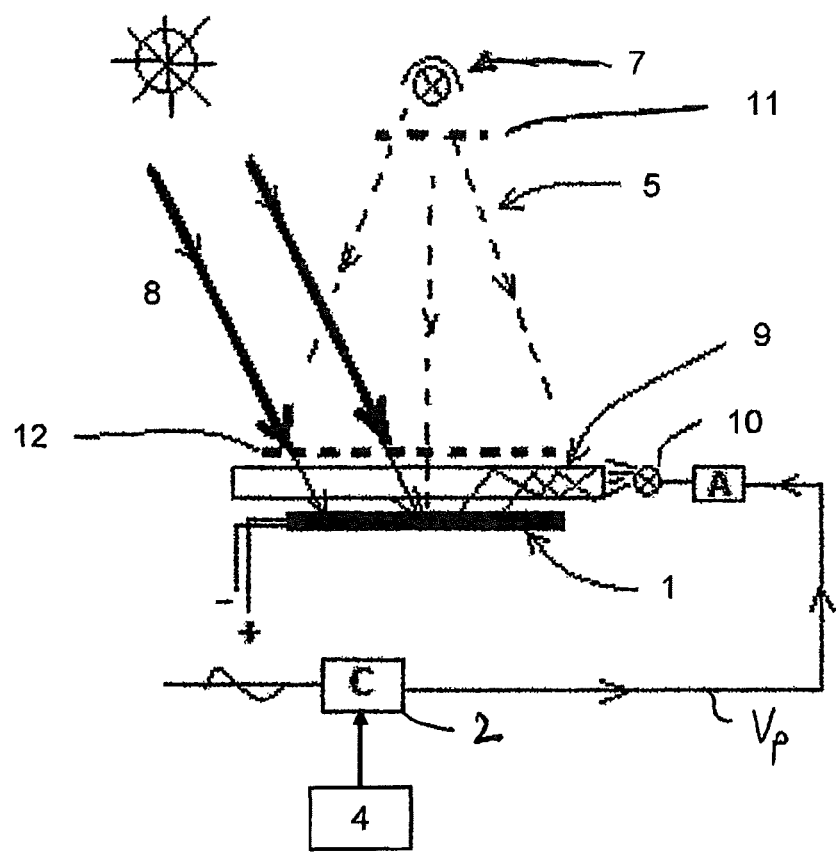
FIG. 3 shows a variant of said device for adapting the electric polarizing voltage on the basis of an illumination system disposed on the front face of the photovoltaic module.

FIG. 3 describes an embodiment example of the device according to the invention, allowing the electric polarizing voltage of the photovoltaic module 1 to be varied as a function of the digital signal delivered as output from the analog/digital converter 3 and of the ambient luminosity. This solution involves illuminating said photovoltaic module 1 with a secondary non-modulated light source 10, the intensity A of which is controlled C by the management module 4 in order to adapt itself as a function of the ambient light 8 and of the modulated light signal 5.

It is important that this secondary lighting device 10 is able to be rendered transparent and, to this end, for a transparent waveguide plate 9 to be placed on the front face of the photovoltaic module 1, i.e. between said module 1 and the source 7 of modulated light 5. Said transparent plate 9 is optically structured and allows the secondary light 10 to be guided in its thickness and to preferably exit toward the active face of the photovoltaic module 1. The advantage of such a device is that it also can contain one or more optical system(s) (11, 12) of lens or polarizer type, which allows the intensity of the ambient light 8 to be reduced when it is too high compared to the intensity of the modulated light 5.

Advantages of the Invention

Ultimately, the invention meets the fixed aims by allowing the dedicated photovoltaic module to be used, for example, to manage high fluxes when the LiFi flux is low by adequately polarizing said module with non-modulated light. The invention allows automatic and real-time management of the various luminous environment configurations by adapting the device so as to optimize the rate of received data.

Embodiment Example

A trial was conducted on the basis of a semi-transparent photovoltaic module (with 10 mV voltage in an open circuit and subject to 400 lux) integrated in a telephone screen, said telephone being provided with an application for loading, from the photovoltaic module, and playing the multimedia content associated with the address indicated by the modulated light signal. Indeed, the modulated light signal is emitted by an LED lamp sending an identifier of "Manchester asymmetric" type that is known to a person skilled in the art.

The telephone triggers said multimedia content up to 25 cm away from the lamp, i.e. for values of more than 23 500 lux from the LED lamp. When the telephone is moved away from the lamp, the modulated light signal received by the photovoltaic module is no longer sufficient to be decoded by the application. In order to overcome this problem and to thus increase the range of the modulated light signal, the surface of the telephone simply needs to be illuminated with a flash light with a non-modulated flux (test performed for flash lights with white and UV/deep blue LEDs). Thus, surprisingly, by adding ambient light without modulated intensity to the LiFi signal, the application operates up to a distance of 57 cm, that is a modulated light signal with an intensity of 5300 lux. The range is therefore multiplied by a factor of 2 by illuminating the photovoltaic module with a non-modulated light. In other words, the overall light intensity is reduced (modulated and non-modulated) that is needed to detect the signal, which is equal to 9500 lux in this embodiment example. It is to be noted that the sum of the modulated and non-modulated light intensities taken individually is not a priori equal, in terms of the photovoltaic receiver that is the subject matter of the invention, to the sum of the light intensities of the two simultaneously lit sources.

The invention claimed is:

1. A wireless communication device using light, comprising:
   at least one light source emitting a modulated light signal;
   at least one photovoltaic module capable of receiving said modulated light signal;
   at least one analog/digital converter electrically connected to the output terminals of said photovoltaic module, allowing the analog signal delivered by the photovoltaic module to be converted into a digital signal;

means for polarizing said photovoltaic module configured to generate a polarizing voltage applied to the terminals of said photovoltaic module, and a management module receiving as input the digital signal delivered by said analog/digital converter to optimize said polarizing voltage toward a threshold voltage corresponding to an improved signal-to-noise ratio and communication rate.

2. The communication device as claimed in claim 1, wherein said means for polarizing said photovoltaic module are formed by a voltage generator configured to generate an electric voltage on the terminals of the photovoltaic module, said voltage being equivalent to that generated by a non-modulated additional illumination, distinct from the modulated light signal.

3. The communication device as claimed in claim 1, wherein said means for polarizing said photovoltaic module are formed by at least one continuous light source in addition to and distinct from the light source emitting the modulated light signal, said continuous light source also illuminating the active surface of said photovoltaic module so as to create a polarizing voltage controlled by said management module.

4. The communication device as claimed in claim 3, wherein said continuous light is guided in a transparent plate that is positioned above the active surface of the photovoltaic module so that said continuous light reaches the active surface of the photovoltaic module.

5. The communication device as claimed in claim 1, wherein said photovoltaic module or the source of modulated light or a transparent plate or a source of continuous light further comprise an optical system of lens, spectral filter or polarizing filter type.

6. The communication device as claimed in claim 1, wherein said photovoltaic module is semi-transparent, made up of a plurality of opaque active photovoltaic zones separated by transparent zones.

7. The communication device as claimed in claim 1, wherein said photovoltaic module is formed by a single photovoltaic cell or by a plurality of photovoltaic cells electrically connected in series or in parallel.

8. The communication device as claimed in claim 1, wherein said management module is configured to define, by successive iterations, the value of the optimal polarizing voltage corresponding to the best signal-to-noise ratio or to the best communication rate.

9. The communication device as claimed in claim 2, wherein said management module comprises a processing program that considers, in real time, the output signal of the analog/digital converter and the value of the voltage corresponding to the non-modulated additional illumination.

10. A method for optimizing the signal-to-noise ratio and the communication rate of a communication device as claimed in claim 1, comprising:
1) initializing the system by:
   a) measuring the signal level at the terminals of the photovoltaic module;
   b) measuring the reference signal-to-noise ratio (SNR_ref);
   c) selecting a maximum permissible polarizing voltage;
2) adapting the polarizing of the photovoltaic module by:
   a) increasing the polarizing voltage;
   b) measuring the signal-to-noise ratio (SNR_mes) and comparing said measured signal-to-noise ratio (SNR_mes) with the reference signal-to-noise ratio (SNR_ref);
   c) if SNR_ref≤SNR_mes, then SNR_mes=SNR_ref and return to step 2) a);
   d) if SNR_ref>SNR_mes, the module is polarized with the preceding polarizing value, which corresponds to the optimal value.

* * * * *